US009420891B2

(12) United States Patent
Oh et al.

(10) Patent No.: US 9,420,891 B2
(45) Date of Patent: Aug. 23, 2016

(54) FOAM FURNITURE MOLDED AROUND A RIGID FOAM CORE

(71) Applicant: Zinus Inc., San Leandro, CA (US)

(72) Inventors: Suk Kan Oh, Xiamen (CN); Youn Jae Lee, Pleasanton, CA (US)

(73) Assignee: Zinus, Inc., San Leandro, CA (US)

( * ) Notice: Subject to any disclaimer, the term of this patent is extended or adjusted under 35 U.S.C. 154(b) by 49 days.

(21) Appl. No.: 14/259,156

(22) Filed: Apr. 23, 2014

(65) Prior Publication Data

US 2015/0150380 A1      Jun. 4, 2015

Related U.S. Application Data

(63) Continuation-in-part of application No. 14/093,222, filed on Nov. 29, 2013.

(30) Foreign Application Priority Data

Jan. 23, 2014   (CN) .......................... 2014 1 0031445

(51) Int. Cl.
*A47C 5/12* (2006.01)
*A47C 7/18* (2006.01)
*A47C 7/20* (2006.01)
(Continued)

(52) U.S. Cl.
CPC ... *A47C 5/12* (2013.01); *A47C 3/16* (2013.01); *A47C 5/125* (2013.01); *A47C 7/18* (2013.01); *A47C 7/185* (2013.01); *A47C 7/20* (2013.01); *B29C 44/1285* (2013.01); *B29L 2031/443* (2013.01)

(58) Field of Classification Search
CPC .... B29K 2075/00; A47C 27/148; A47C 7/18; A47C 5/125; A47C 7/20; A47C 5/12; A47C 3/16; A47C 7/185

USPC .............. 297/452.37, 452.35, 452.32, 452.3, 297/DIG. 1
See application file for complete search history.

(56) References Cited

U.S. PATENT DOCUMENTS 2,880,428 A *  4/1959  Forsland .................. A47G 9/10
                                                            5/636
3,161,436 A *  12/1964  Hood .................. A47C 27/146
                                                            264/229

(Continued)

FOREIGN PATENT DOCUMENTS

CN        2081676 U      2/1991
CN        1273979 A      5/1999
(Continued)

*Primary Examiner* — Milton Nelson, Jr.
(74) *Attorney, Agent, or Firm* — Imperium Patent Works; Darien K. Wallace

(57) ABSTRACT

A foam seating article includes an outer layer of molded foam surrounding a solid inner core of molded foam or expanded polystyrene. The rigid foam of the inner core is made from polyurethane polyol and methylene diphenyl diisocyanate (MDI). The inner core has a hardness greater than 25 Shore A and a density less than two pounds per cubic foot. The polymer material of the solid core has a hardness that is greater than that of the outer foam. The outer layer of molded foam is high density (HD) foam, memory foam or latex foam. A fabric covering encloses the inner core and molded outer foam layer. The foam seating article can be a chair, stool, sofa, chaise lounge, bench or Ottoman. The seating article includes no wood or metal. Molding foam around a solid inner core is simpler and less costly than making conventional metal or wood framed furniture.

16 Claims, 17 Drawing Sheets

(51) Int. Cl.
*A47C 3/16* (2006.01)
*B29C 44/12* (2006.01)
*B29L 31/44* (2006.01)

(56) References Cited

U.S. PATENT DOCUMENTS

| | | | | |
|---|---|---|---|---|
| 3,842,453 | A * | 10/1974 | Redfield | A61H 1/00 5/491 |
| 4,118,813 | A * | 10/1978 | Armstrong | A61F 5/56 5/636 |
| 4,471,993 | A * | 9/1984 | Watson | 297/284.5 |
| 4,988,090 | A | 1/1991 | Schmitt | 272/56.5 |
| 5,116,557 | A | 5/1992 | Debaes et al. | 264/46.6 |
| 5,240,528 | A | 8/1993 | Pagni | 156/79 |
| 5,415,461 | A | 5/1995 | Sakamoto | 297/440.1 |
| 5,744,231 | A | 4/1998 | Igarashi et al. | 428/318.6 |
| 5,801,211 | A | 9/1998 | Tornero et al. | 521/159 |
| 5,857,742 | A | 1/1999 | Karl et al. | 297/248 |
| 6,022,205 | A | 2/2000 | Marlowe | 425/4 |
| 6,360,387 | B1 * | 3/2002 | Everhart | A47C 20/027 5/490 |
| 6,684,433 | B2 | 2/2004 | Giori et al. | 5/709 |
| 6,702,391 | B1 | 3/2004 | Stipek | 297/452.65 |
| 6,726,284 | B2 | 4/2004 | Cleary | 297/411.45 |
| 6,840,584 | B2 | 1/2005 | Rocheford | 297/451.6 |
| 7,083,173 | B2 | 8/2006 | Lehr et al. | 280/28.16 |
| 7,201,625 | B2 | 4/2007 | Yeh | 441/65 |
| 7,571,965 | B1 | 8/2009 | Perry | 297/452.26 |
| 8,141,957 | B2 | 3/2012 | McClung et al. | 297/452.27 |
| 8,158,249 | B2 * | 4/2012 | Greer | 428/319.3 |
| 8,318,283 | B2 | 11/2012 | Hsu | 428/71 |
| 8,398,166 | B2 * | 3/2013 | Lindsay et al. | 297/216.1 |
| 8,496,860 | B2 | 7/2013 | Varner et al. | 264/45.7 |
| 2004/0026970 | A1 | 2/2004 | Vassar et al. | 297/218.1 |
| 2006/0145526 | A1 | 7/2006 | Niekel et al. | 297/452.14 |
| 2008/0292830 | A1 | 11/2008 | Greer | 428/71 |
| 2011/0008608 | A1 | 1/2011 | Bellin et al. | 428/305.5 |
| 2011/0192564 | A1* | 8/2011 | Mommer | H01M 2/1094 165/10 |
| 2011/0256369 | A1* | 10/2011 | Switzer et al. | 428/215 |
| 2011/0293914 | A1 | 12/2011 | Maurer et al. | 428/304.4 |
| 2013/0049389 | A1* | 2/2013 | Hipshier | B29C 44/086 296/1.08 |

FOREIGN PATENT DOCUMENTS

| | | | | |
|---|---|---|---|---|
| DE | EP 0044083 | A1 * | 1/1982 | B29C 33/68 |
| EP | 0179043 | | 10/1984 | |
| FR | 2996809 | A1 * | 4/2014 | B60N 2/48 |
| JP | 58185235 | A * | 10/1983 | |

* cited by examiner

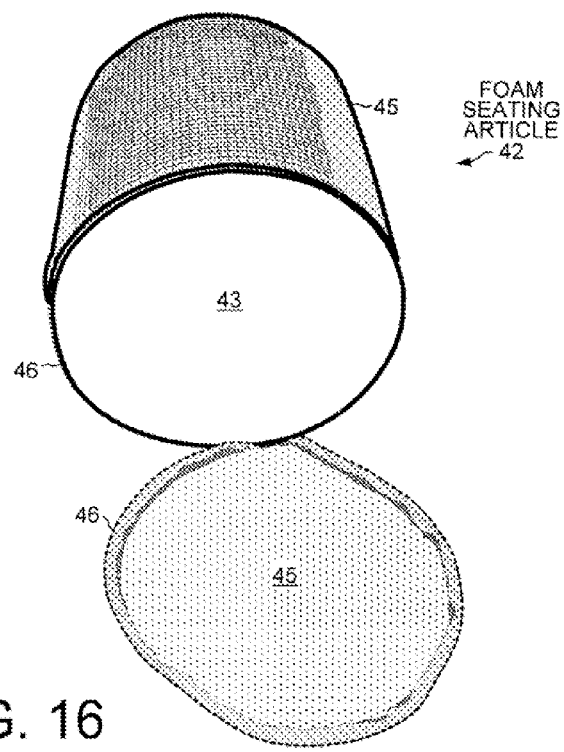
FIG. 16
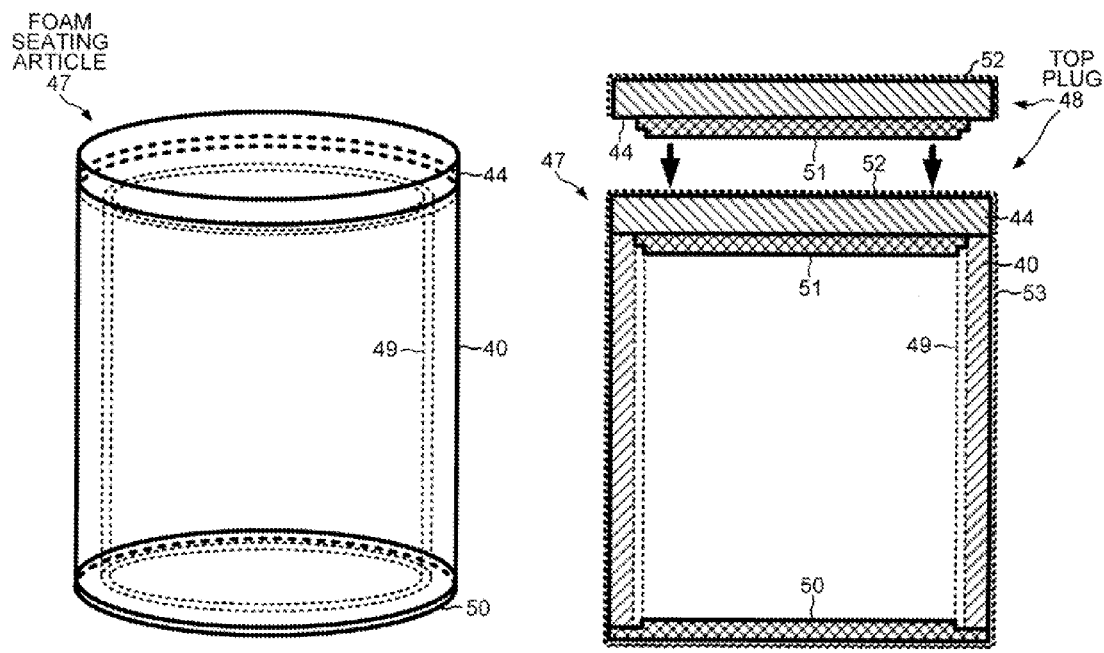
FIG. 17A
FIG. 17B

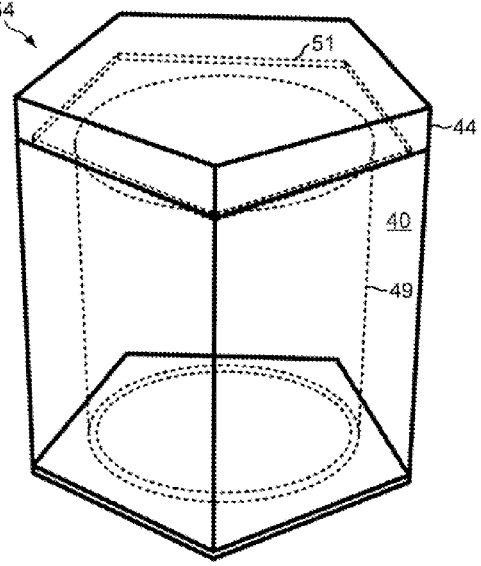
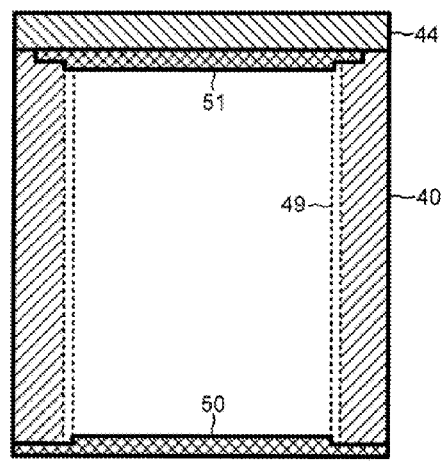
FIG. 18A        FIG. 18B
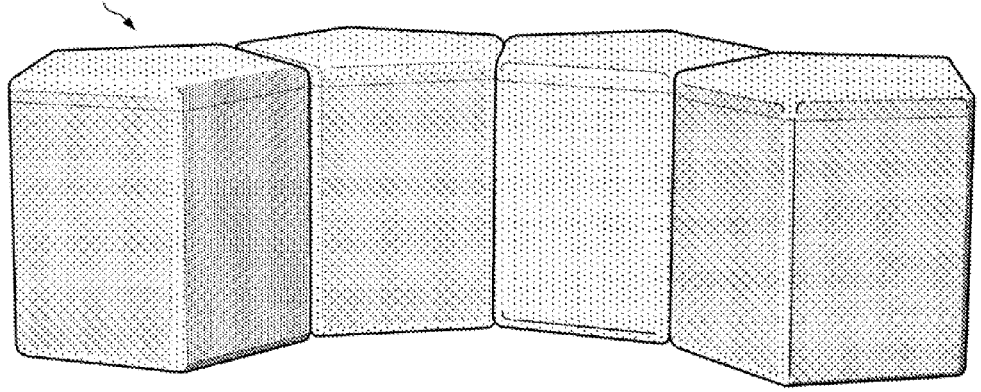
FIG. 19

FOAM FURNITURE MOLDED AROUND A RIGID FOAM CORE

CROSS REFERENCE TO RELATED APPLICATION

This application is a continuation-in-part of, and claims priority under 35 U.S.C. §120 from, nonprovisional U.S. patent application Ser. No. 14/093,222 entitled "Foam Furniture Molded Around A Hollow Shell Of Hard Plastic," filed on Nov. 29, 2013. This application is also a continuation-in-part of, and claims priority under 35 U.S.C. §119 from Chinese Patent Application No. 201410031445.6, filed on Jan. 23, 2014, in China, the contents of which are hereby incorporated by reference. The entire subject matter of U.S. application Ser. No. 14/093,222 and Chinese application serial number 201410031445.6 is incorporated herein by reference.

TECHNICAL FIELD

The present invention relates generally to upholstered furniture for seating and, more particularly, to furniture made by molding an outer layer of foam around either a hollow inner shell of hard plastic or an inner core of molded foam.

BACKGROUND

Conventional upholstered furniture for seating is made by placing padding and upholstery around a weight-bearing frame. The frame is made primarily by joining linear members of wood or metal. Often springs are also used to provide a cushioned seating surface. It is a challenge to use conventional materials to make furniture that is not mostly rigid with linear sections. Thus, making a rounded frame by bending metal and shaping wood and then adding springs, padding and upholstery is labor intensive and costly. Moreover, the wood or metal frames are usually heavy, which adds to the cost of transportation.

Foam is sometimes used as one of the padding components of upholstered furniture. However, foam that is suitably soft to cushion seating furniture cannot also provide sufficient structural integrity to support the structure of the furniture. Using the cushioning foam also as the frame for foam seating furniture provides insufficient support. A method is sought for making seating furniture using foam as the cushioning and upholstery padding that does not also require a heavy wood or metal frame.

SUMMARY

In one embodiment, a foam seating article includes an outer layer of molded foam surrounding a solid inner core of molded foam or expanded polystyrene. The rigid molded foam of the inner core is made from polyurethane polyol and methylene diphenyl diisocyanate (MDI) and may also include toluene diisocyanate (TDI). For example, the inner core contains between 100 kg and 120 kg of MDI for every 100 kg of polyurethane polyol. The inner core has a hardness greater than 25 Shore A and a density less than one pound per cubic foot. The polymer material of the solid core has a hardness that is greater than that of the molded foam of the outer layer. The outer layer of molded foam is made from high density (HD) foam, visco-elastic memory foam or latex foam. A covering encloses the inner core and molded outer foam layer. In one aspect, a layer of memory foam is glued on top of the outer layer of foam before placing the covering around the outer layer of foam, the solid inner core and the layer of memory foam. The foam seating article can take the form of a chair, stool, sofa, chaise lounge, bench or Ottoman. The seating article includes no wood or metal.

In another embodiment, a foam seating article includes a layer of molded foam surrounding a hollow shell made of hard plastic. A covering encloses the molded foam and the shell. The covering is made of woven fabric, nonwoven fabric, leather, or a conformal plastic layer. The foam seating article can take the form of a chair, stool, sofa, chaise lounge, bench or Ottoman. The hollow shell can be formed using blow molding, injection molding or by capping both ends of a tube with disks. The hard plastic shell is made of polypropylene, polyethylene, polyvinyl chloride (PVC), polyvinyl acetate (PVA) or a thermoplastic elastomer (TPE). The hollow shell has an uneven outer surface with dimples, grooves or crevices to which the foam of the molded foam layer adheres.

Air pressure inside the airtight hollow shell prevents the shell from collapsing inwards under the weight of an occupant. Alternatively, the hollow shell of the seating article can be accessed through a removable top plug. The seating article includes no wood or metal. The layer of molded foam includes sections of different foam types, such as high density (HD) foam, memory foam and latex foam.

Molding foam around a hard plastic shell is simpler and less costly than manufacturing furniture with the conventional process of shaping metal and wood to make a frame and then adding springs, padding and upholstery. And it is easier to make curved shapes by molding the inner shell and outer foam than it is to make a curved inner frame from wood or metal.

A foam seating article is manufactured by blow molding a hollow shell of hard plastic. Alternatively, the shell is formed using by injection molding or by attaching disks to both ends of a tube. When blow molding is used to make the shell, a tube of resin is placed inside a mold and sealed at both ends. Air is blown into the resin tube such that the resin expands outwards and takes the shape of the interior of the mold. The resin tube is then cured, and the cured resin shell is removed from the mold.

The hollow shell is placed in a second mold, and foam is molded around the outer surface of hollow shell. Liquid foam precursors are injected into the space between the shell and the inner walls of the second mold. Different kinds of foams are successively poured into the second mold, such as an extra hard foam with an ILD of about twenty, and HD foam with an ILD of about fifteen, and a memory foam with an ILD of about twelve. The liquid foam precursors of the molded foam layer are cured, and the foam and enclosed shell are removed from the second mold.

A covering is then placed around the molded foam layer and the hollow shell. The covering is made of woven fabric, nonwoven fabric, leather or a conformal plastic or rubber layer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 16 is a bottom perspective view of a cylindrical foam seating article with an unzipped bottom circular flap of a fabric covering.

FIG. 17A is a perspective view of a foam seating article similar to that of FIG. 15 except that the top plug is removable and allows access to the hollow shell.

FIG. 17B is a cross-sectional view of the foam seating article of FIG. 17A.

FIG. 18A is a perspective view of a foam seating article similar to that of FIGS. 17A-B except that the horizontal cross section of the outside of the molded foam layer is pentagonal instead of circular.

FIG. 18B is a cross-sectional view of the foam seating article of FIG. 18A.

FIG. 19 is a perspective view of four modular blocks of the foam seating article of FIGS. 18A-B.

DETAILED DESCRIPTION

Reference will now be made in detail to some embodiments of the invention, examples of which are illustrated in the accompanying drawings.

Figure 1:
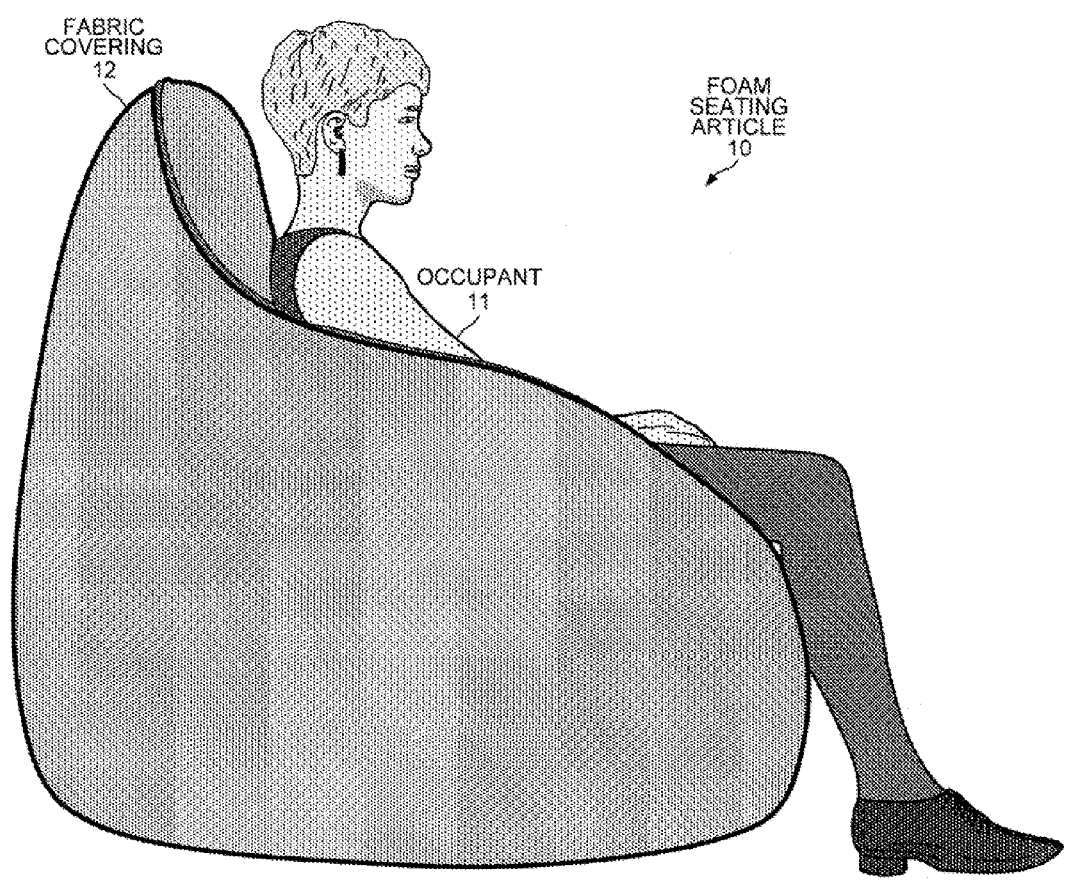
FIG. 1 is a perspective view of an occupant seated in a foam seating article made by molding foam around a hollow, hard plastic shell.

The present invention is generally directed towards chairs. However, the invention disclosed herein can be successfully used in connection with other types of seating furniture such as sofas, chaise lounges, benches, Ottomans, and the like. FIG. 1 shows a foam seating article 10 in the form of a chair that is sized and configured to allow a single person to use the chair at one time. But other configurations of chair 10 could be sized and configured to allow two or more persons to sit on the chair at the same time. Chair 10 has a thick layer of molded memory foam surrounding a hollow shell of hard plastic. Thus, much of the inner volume of chair 10 is air. The hollow shell is made airtight in order to increase the rigidity of the hard plastic shell. For example, a shell of polypropylene can provide sufficient support with a thickness of only three millimeters if the hollow shell is completely enclosed. The major weight component of chair 10 is the layer of molded memory foam that surrounds the hollow shell. Nevertheless, chair 10 still weighs much less than an equivalently sized chair with an inner wood or metal frame.

FIG. 1 shows an occupant 11 comfortably seated in foam seating article 10. A woven fabric covering 12 surrounds the memory foam. In other embodiments, chair 10 has a covering made of nonwoven fabric, leather or even a conformal plastic layer.

Figure 2:
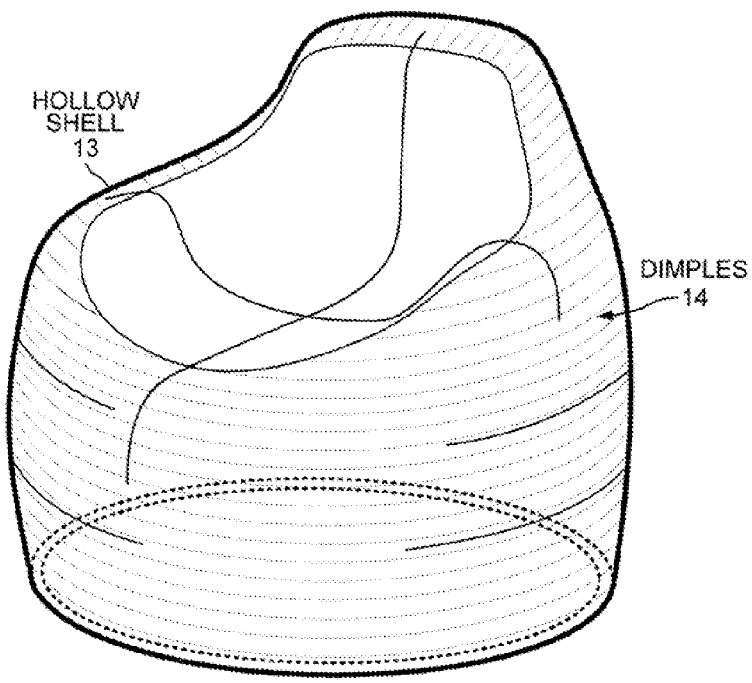
FIG. 2 shows the hollow, hard plastic shell that forms a frame inside the seating article of FIG. 1.

FIG. 2 shows the hollow shell 13 of hard plastic around which the thick layer of memory foam is molded to form chair 10. Shell 13 is formed by blow molding a thermoplastic resin into a first mold. The thermoplastic resin is first extruded in the form of a tube or sheet, which is then expanded by blowing air into the tube inside a blow mold. The thermoplastic resin can be polypropylene (PP) resin, polyethylene (PE) resin, acrylonitrile butadiene styrene (ABS) resin, polyvinyl chloride (PVC) resin, polyvinyl acetate (PVA) resin, polycarbonate resin, polyamide resin, a polyphenylene oxide resin or a blend of these resins.

In the embodiment of FIG. 2, shell 13 is made from a tube of 3-millimeter thick plasticized polypropylene (PP) resin. The tube is placed inside the first mold and then sealed at both ends. The two halves of the first mold are then closed. Air is blown into the tube such that the blown up tube takes the shape of the interior of the first mold. For example, air can be blown into the tube through an injection needle that punctures the tube. The needle passes through both the first mold and the tube of resin. The first mold includes small escape holes that allow the air trapped between the walls of the mold cavity and the resin tube to escape as the tube is filled with air and expands outwards to the walls of the mold. The sealed resin tube entirely covers the inside walls of the first mold. The resin tube is then cured and hardens when it is heated. The two halves of the first mold are then opened, and the cured resin tube is removed from the mold. The cured resin tube forms shell 13. The tiny hole made by the injection needle is glued closed such that the shell 13 is air tight. The air pressure inside shell 13 provides added strength and helps to prevent the shell from collapsing inwards under the weight of occupant 11.

Foam is later molded around the outer surface of shell 13. In the embodiment in which shell 13 is made of polypropylene surrounded by visco-elastic polyurethane foam (memory foam), the foam naturally sticks to the surface of the shell. In other embodiments, however, it is advantageous to generate additional adhesion between the shell and the foam by forming an uneven outer surface on the shell to which the foam can better attach. For example, dimples, grooves or crevices can be formed on the outside surface of shell 13 by providing micro-bumps or ribs on the inside surface of the first mold. The molded foam then sets up inside the dimples, grooves and crevices and becomes even more attached to shell 13. FIG. 2 shows rows of dimples 14 that have been formed in the outer surface of shell 13.

Figure 3:
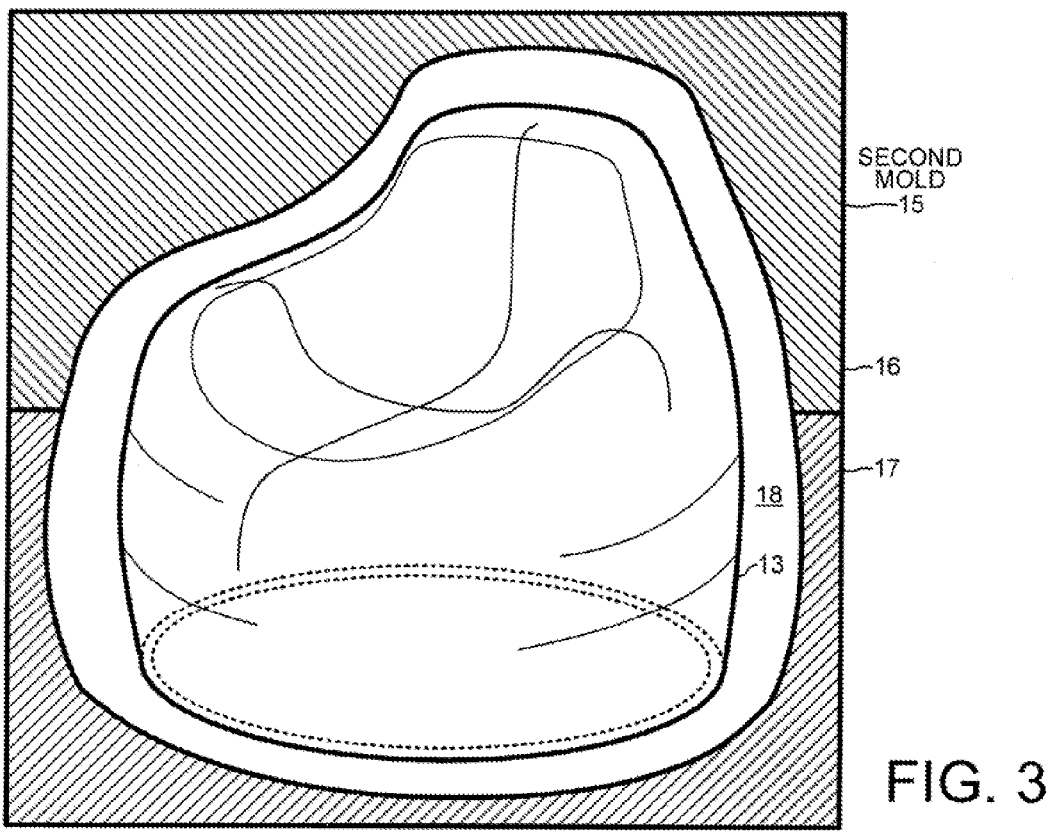
FIG. 3 illustrates the hard plastic shell of FIG. 2 inside a mold for foam.

FIG. 3 illustrates how foam is molded around shell 13 by placing the shell inside a second mold 15. Second mold 15 has multiple sections, such as the top half 16 and bottom half 17 shown in FIG. 3. In other embodiments, the second mold has a right half and a left half, or the second mold has more than two sections. After shell 13 is placed inside bottom half 17, top half 16 is closed. A foam precursor mixture is then injected into the space 18 between shell 13 and the inner mold walls. In one embodiment, two kinds of foam are molded around shell 13. First, "high density" (HD) polyurethane foam is poured into space 18 in second mold 15 until about the bottom half of the mold cavity is filled. Second, visco-elastic memory foam is then poured into the remaining space between shell 13 and the inner mold walls. Latex can be used instead of memory foam in the remaining space. The molded foam is then allowed to set, and the second mold 15 is removed.

In another embodiment, an extra hard foam can be added first such that the bottom several inches of chair 10 have a more durable base. The indentation load deflection (ILD) is one measure of foam hardness defined in the ISO 2439 standard. The extra hard bottom foam layer can have an ILD of about twenty, while the HD foam has an ILD of fifteen, and the memory foam has an ILD of twelve. The "high density" HD foam is somewhat of a misnomer because the memory foam has a higher density than does the HD foam. Density and hardness are not synonymous. Generally, denser foam is more durable. Typically, the HD foam used for cushioning has a density of between 1.5 to 2.5 pounds per cubic foot, whereas memory foam typically has a density between three and 5.5 pounds per cubic foot. Memory foam is temperature sensitive. At room temperature memory foam is harder than at skin temperature. Memory foam softens on contact and molds itself to the shape of a warm body within a few minutes. As occupant 11 sits on the memory foam that covers the top of chair 10, the foam becomes softer, more pliant and more elastic.

Figure 4:
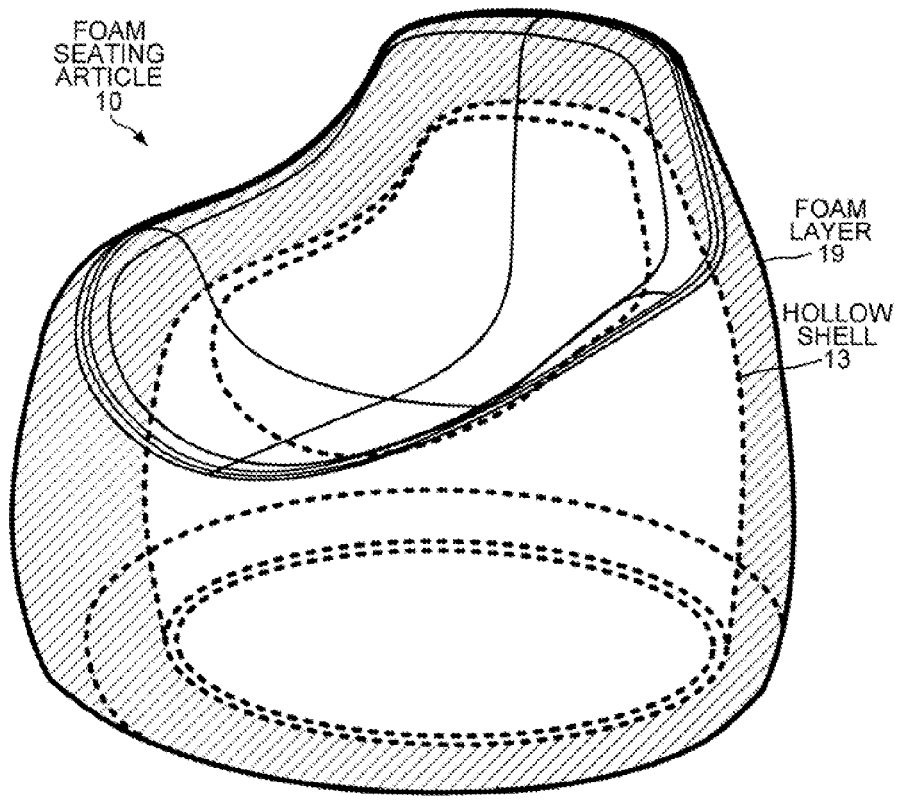
FIG. 4 is a perspective view of the foam seating article of FIG. 1 after being removed from the mold of FIG. 3 and before a fabric covering is added.

FIG. 4 shows foam seating article 10 after being removed from second mold 15 and before fabric covering 12 has been added. A layer of molded foam 19 surrounds hollow shell 13. The thickness of molded foam layer 19 is about equal around shell 13 except on the bottom, where layer 19 is thinner.

Figure 5:
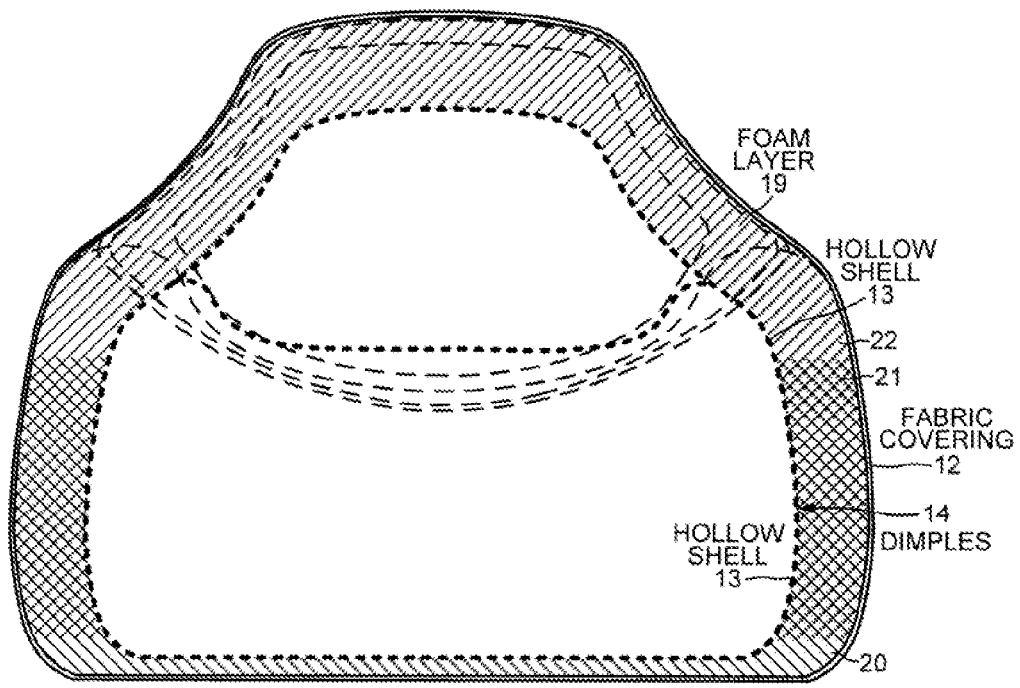
FIG. 5 is a cross-sectional view of the seating article of FIG. 4 showing the thickness of the molded foam layer around the shell.

FIG. 5 is a cross-sectional view of chair 10 showing the thickness of molded foam layer 19. Layer 19 includes a hard foam base portion 20, an HD foam bottom portion 21 and a memory foam top portion 22. The precursors of the different types of foam are poured into second mold 15 in a liquid state and cure together. Thus, no adhesive is required to bind the three foam portions together. Molded foam layer 19 naturally sticks to hard plastic shell 13. However, the molded foam that flows into the dimples 14 in the outside surface of shell 13 provides additional bonding of layer 19 to shell 13.

Figure 6:
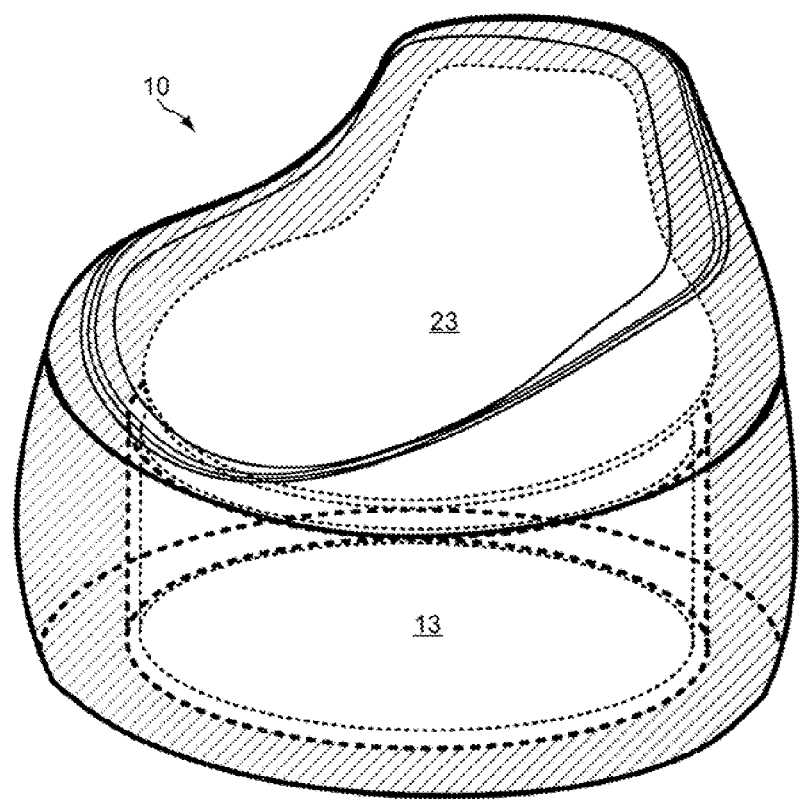
FIG. 6 is a perspective view of another embodiment of a foam seating article in which the inner shell includes both a curved sitting surface that is not hollow and a hollow cylindrical portion.
Figure 7:
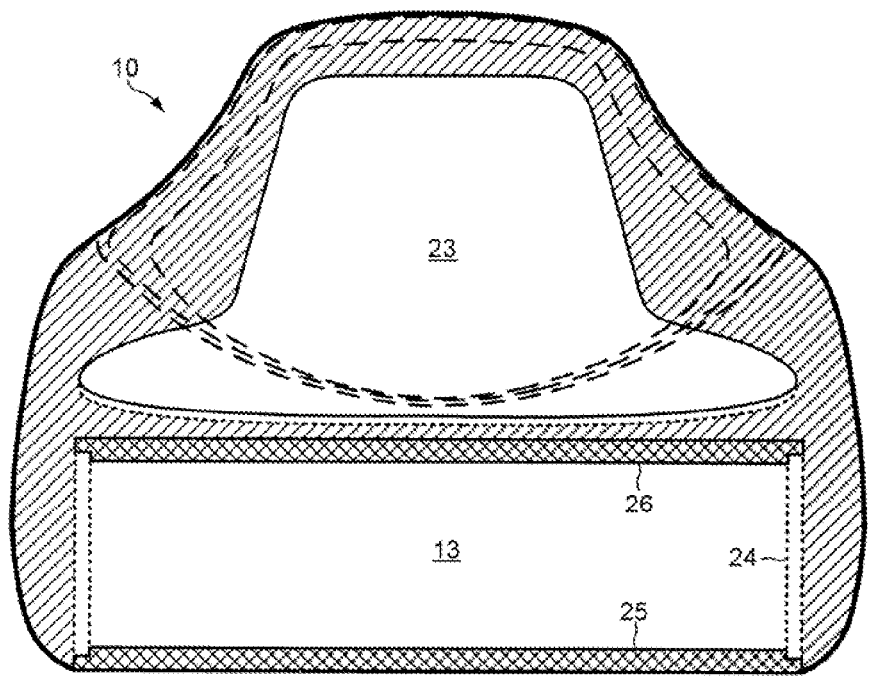
FIG. 7 is a cross-sectional view of the foam seating article of FIG. 6.

FIGS. 6-7 show another embodiment of foam seating article 10 in which hollow shell 13 is cylindrical, and the thickness of molded foam layer 19 is not equal around shell 13. In addition to hollow shell 13, there is a second hard plastic portion 23 about which foam is molded. Second portion 23 is not hollow. Instead, second portion 23 is shaped as a curved sitting surface suspended above the cylindrical hollow shell 13. Hard plastic portion 23 is held in place within second mold 15 while the foam sets up around it. Neither shell 13 nor portion 23 is blow molded. Portion 23 can be injection molded. Shell 13 is a tube 24 that is capped at both ends by plugs 25-26. Tube 24 is extruded polyvinyl chloride (PVC), polyvinyl acetate (PVA), polypropylene, polyethylene or a thermoplastic elastomer (TPE). The plugs 25-26 are shaped as lipped disks that are glued over the ends of tube 24 forming an airtight seal.

Figure 8:
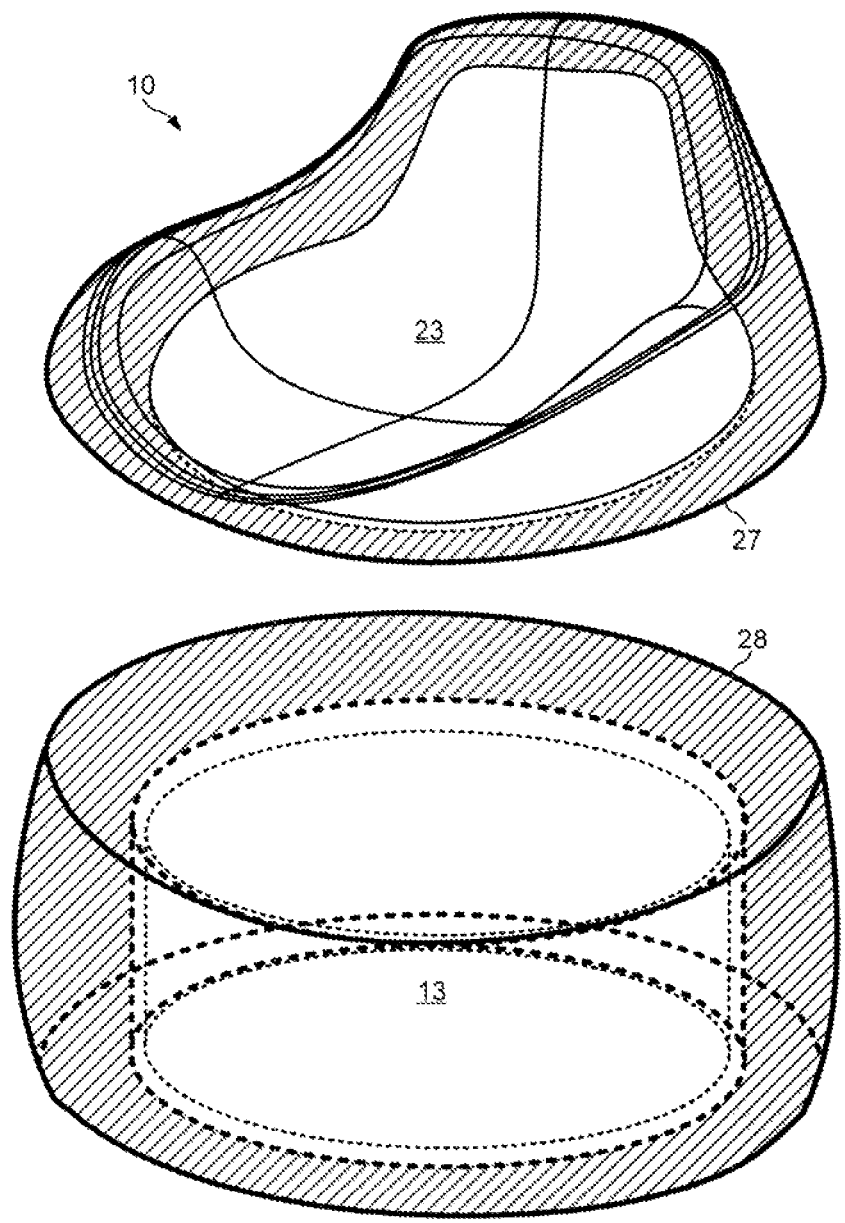
FIG. 8 is an exploded view of the foam seating article of FIG. 6.

FIG. 8 shows an exploded view of foam seating article 10 of FIG. 6-7. A top portion 27 of molded foam layer 19 is shown surrounding second portion 23 of hard plastic. A bottom portion 28 of molded foam layer 19 is shown surrounding cylindrical hollow shell 13.

Figure 9:
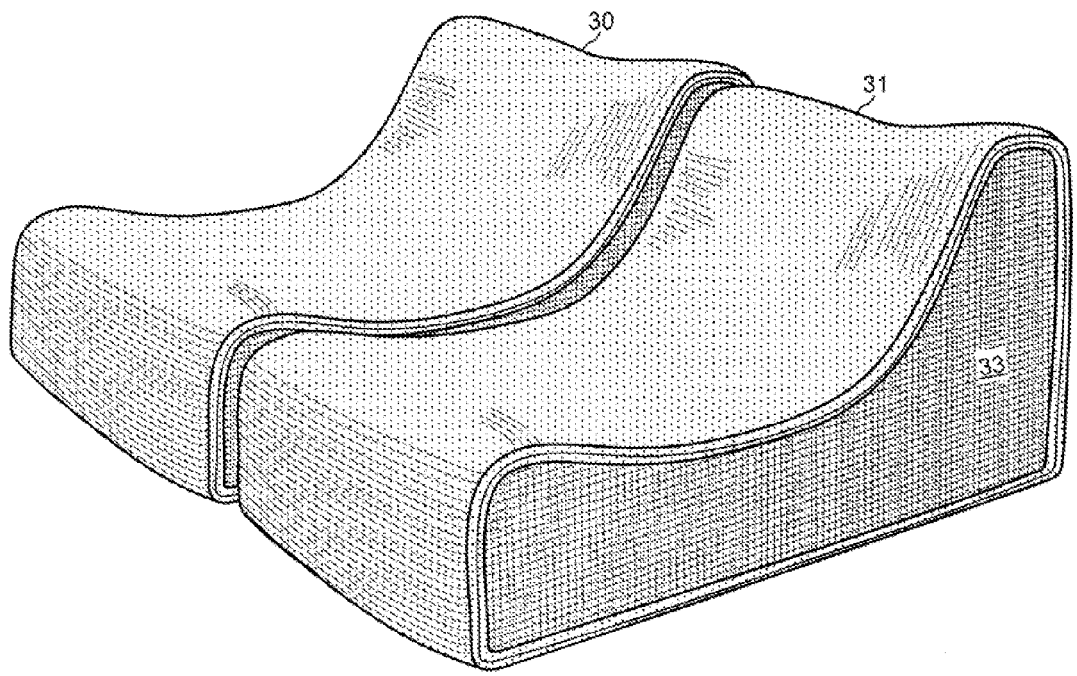
FIG. 9 is a perspective view of two modular foam seating articles shaped as chaise lounges and made in the same way as the foam seating article of FIG. 1 except that the inner hollow shell has a different shape.

FIG. 9 shows two modular foam seating articles 30-31 shaped as chaise lounges. The modular articles 30-31 can be placed together to form larger pieces of furniture, such as a sofa. Foam seating articles 30-31 are made in the same way as foam seating article 10 of FIG. 1 except that the inner hollow shell has a different shape.

Figure 10:
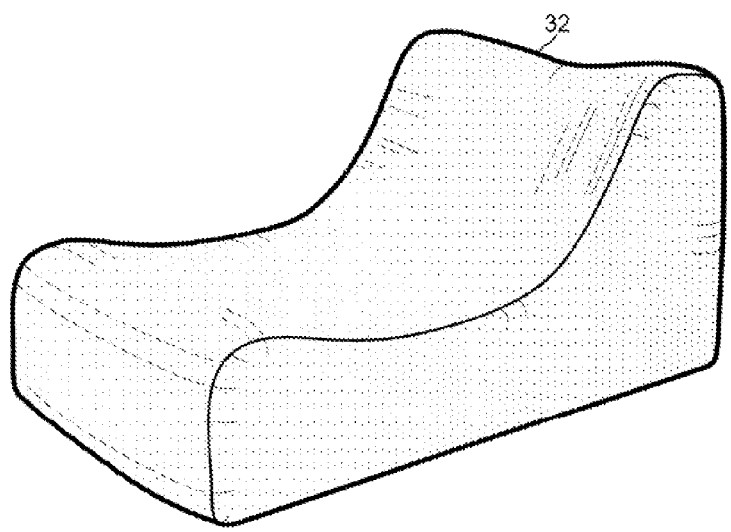
FIG. 10 is a perspective view of the inner hollow shell used to make the foam seating article of FIG. 10.

FIG. 10 shows an inner hollow shell 32 of hard plastic used to make foam seating article 31 of FIG. 9. Shell 32 is formed in the same way as shell 13 is formed by blow molding a thermoplastic resin into a first mold. A layer of foam is then molded around shell 32 using a second mold. A woven fabric covering 33 is then placed around the molded foam.

Figure 11:
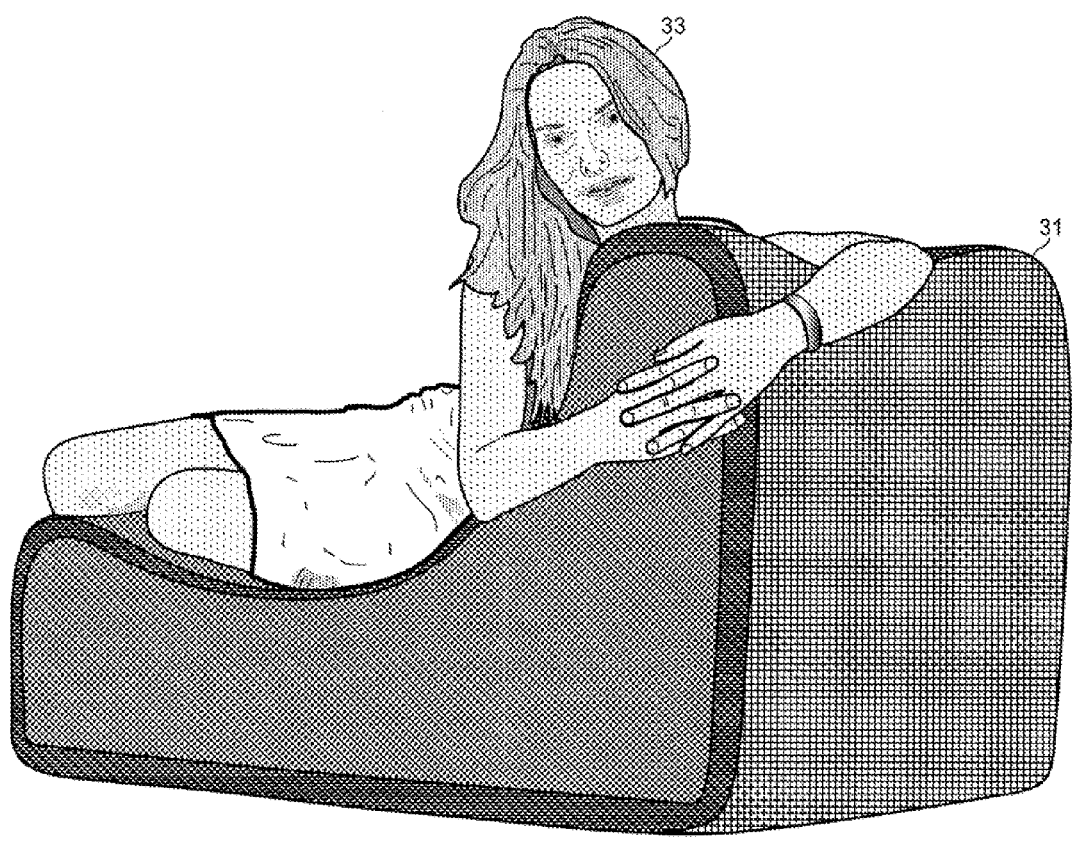
FIG. 11 is a perspective view of an occupant resting on one of the chaise lounges of FIG. 9.

FIG. 11 shows an occupant 33 resting on chaise lounge 31.

Figure 12:
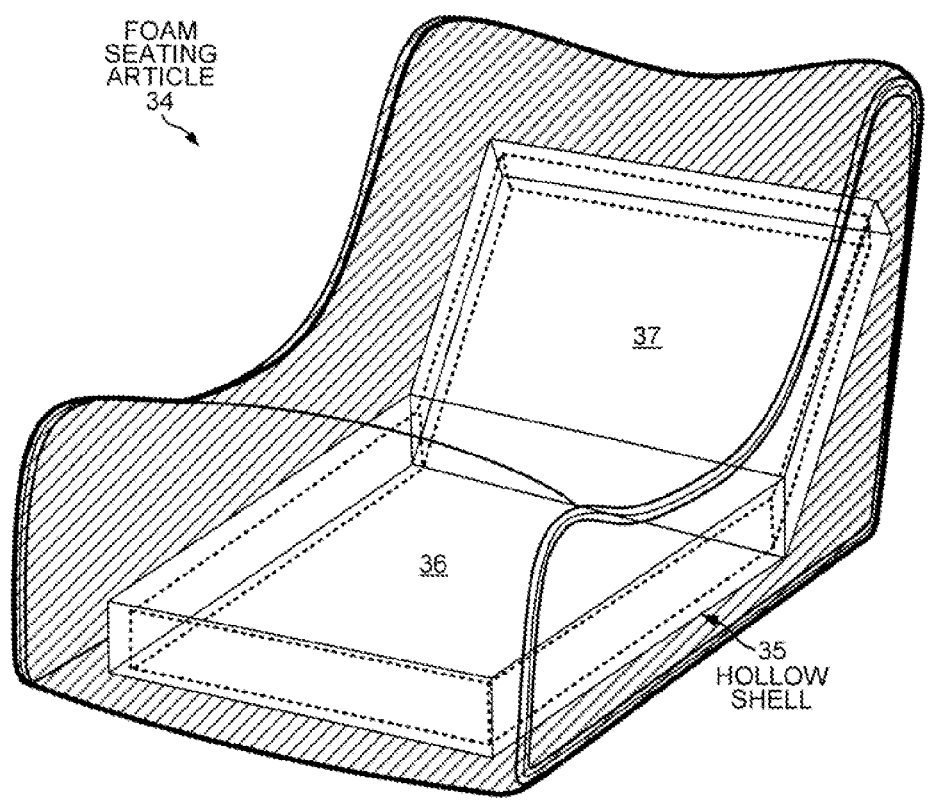
FIG. 12 is a perspective view of a foam seating article shaped as a chaise lounge as in FIG. 9 except that the inner shell is made from planar sheets of hard plastic instead of by blow molding.

FIG. 12 is a perspective view of a foam seating article 34 with a shape similar to that of chaise lounge 31. The inner hollow shell 35 of article 34, however, is not made using blow molding. Shell 35 is constructed from sheets of hard plastic that have been cut to form the planar sides of shell 35. The plastic sheets can be made of polypropylene, polyethylene, polyvinyl chloride (PVC), polyvinyl acetate (PVA) or a thermoplastic elastomer (TPE). The sides of shell 35 can be glued or melted together. Shell 35 has two portions, a bottom portion 36 and a back portion 37. Each portion 36-37 is made airtight, and the two portions are then glued together. For example, the air pressure in airtight bottom portion 36 helps to prevent the flat top from sagging under the weight of the occupant of chaise lounge 34.

Figure 13:
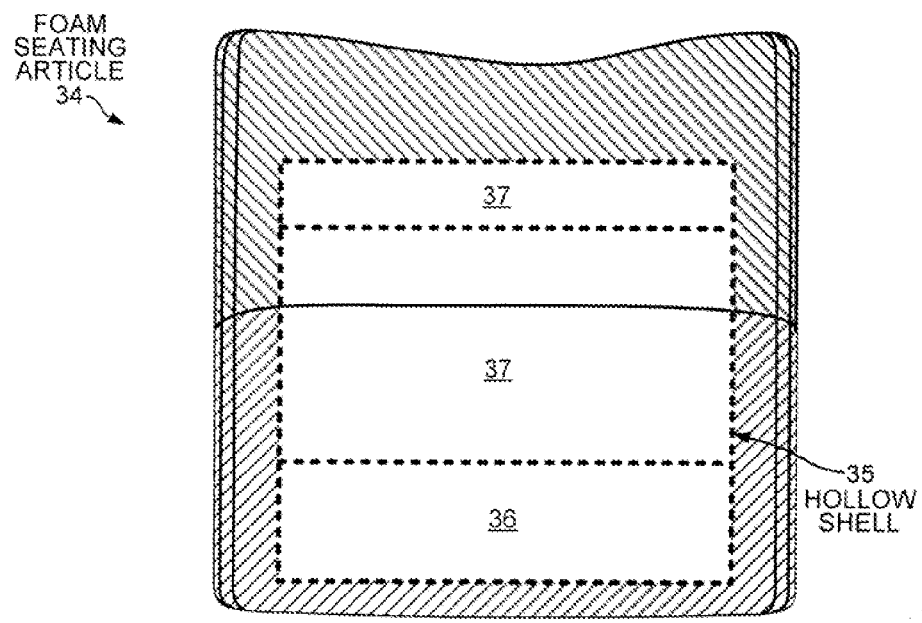
FIG. 13 is a cross-sectional view of the foam seating article of FIG. 12.

FIG. 13 is a cross-sectional view of foam seating article 34 of FIG. 12. FIG. 13 shows that the layer of molded foam that surrounds hollow shell 35 is much thicker above bottom portion 36 of shell 35 than to the sides of shell 35.

Figure 14A:
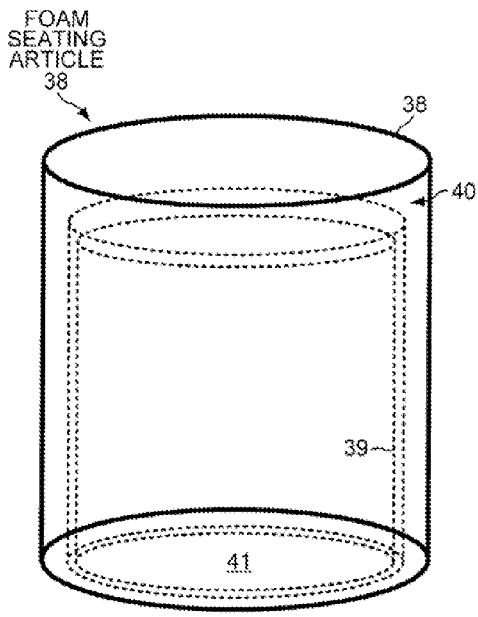
FIG. 14A is a perspective view of a foam seating article in the form of an Ottoman with an inner shell that is open at the bottom.
Figure 14B:
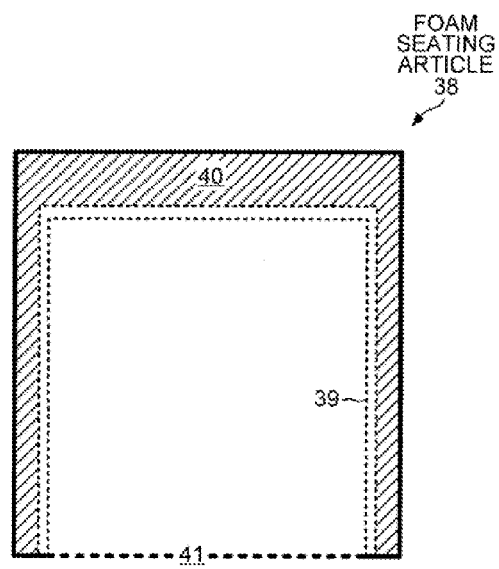
FIG. 14B is a cross-sectional view of the foam seating article of FIG. 14A.

FIGS. 14A-B show perspective and cross-sectional views of a foam seating article 38 in the form of an Ottoman, which can be used as a stool or a foot stool. Ottoman 38 has an inner hard plastic shell 39 that is open at the bottom. Shell 39 is a cylinder with one end closed. Shell 39 is formed as a single piece using injection molding instead of as an extruded tube with a planar, circular plug added separately as in the embodiment of FIG. 7. Foam 40 is then molded around shell 39 leaving the bottom end 41 of the cylindrical shell open. A fabric covering (not shown) is then placed around the molded foam 40 and shell 39. The covering covers the entire Ottoman 38, including the open bottom end 41 of shell 39.

Figure 15A:
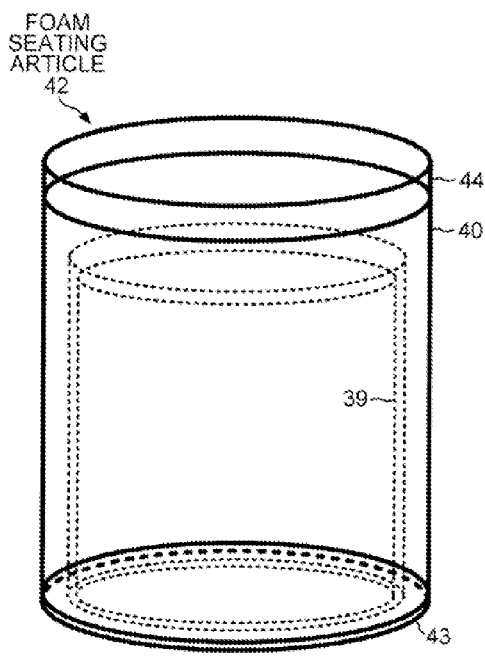
FIG. 15A is a perspective view of a foam seating article in which a hard plastic bottom disk and an upper memory foam disk have been added to the seating article of FIGS. 14A-B.
Figure 15B:
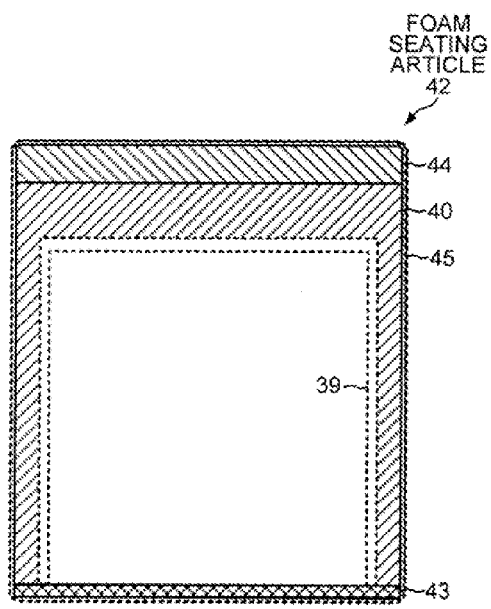
FIG. 15B is a cross-sectional view of the foam seating article of FIG. 15A.

FIGS. 15A-B show a foam seating article 42 in which a hard plastic bottom disk 43 and an upper memory foam disk 44 have been added to Ottoman 38 of FIG. 14. Hard plastic bottom disk 43 is glued over the bottom end 41 of shell 39. Disk 44 of memory foam is glued to the top of molded foam 40. A removable fabric covering 45 is then placed around foam disk 44, molded foam 40 and hard plastic bottom disk 43. The bottom circle of fabric covering 45 can be opened with a zipper to remove the covering 45 from the foam.

FIG. 16 is a bottom perspective view of foam seating article 42 with the bottom circular flap of covering 45 unzipped. A zipper 46 is sewn around the circumference of the bottom flap. When the flap is unzipped, fabric covering 45 can be slid off from the cylindrical Ottoman 42.

FIGS. 17A-B show perspective and cross-sectional views of a foam seating article 47 similar to Ottoman 42 of FIG. 15. Article 47 can be used for storage, however, because the top plug 48 is removable. For example, article 47 can be used as a foot stool for a sofa, as well as a storage bin for children's toys. The shell of article 47 is a tube 49 that is capped at both ends by lipped disks 50-51. Tube 49 is a portion of an extruded polyvinyl chloride (PVC) pipe, and lipped disks 50-51 fit into the ends of tube 49. Lower disk 50 is glued to the bottom end of tube 49. A layer of molded foam 40 is molded around the sides of tube 49. Top plug 48 includes upper disk 51 to which a disk of memory foam 44 is glued. An upper portion 52 of the covering 45 fits around the top of memory foam disk 44. Upper disk 51, memory foam disk 44 and upper portion 52 of the covering 45 together form the top plug 48 and can be removed from article 47 as a unit to gain access to the cavity inside tube 49. A lower portion 53 of the covering 45 fits around molded foam 40 and lower disk 50.

FIGS. 18A-B show perspective and cross-sectional views of a foam seating article 54 similar to seating article 47 of FIG. 17 except for the shape of the molded foam layer 40. The horizontal cross section of the inner, hard-plastic shell is circular, whereas the horizontal cross section of the outside of molded foam layer 40 is pentagonal. Article 54 has a pentagonal top lid made up of upper disk 51, memory foam 44 and a fabric covering (not shown). Upper disk 51 has a circular bottom and a pentagonal upper lip.

FIG. 19 shows four modular blocks of the foam seating article 54. In addition to being usable as an Ottoman together with a sofa, the blocks 54 of FIG. 19 can also be used in a children's room as stools that store toys.

Figure 20:
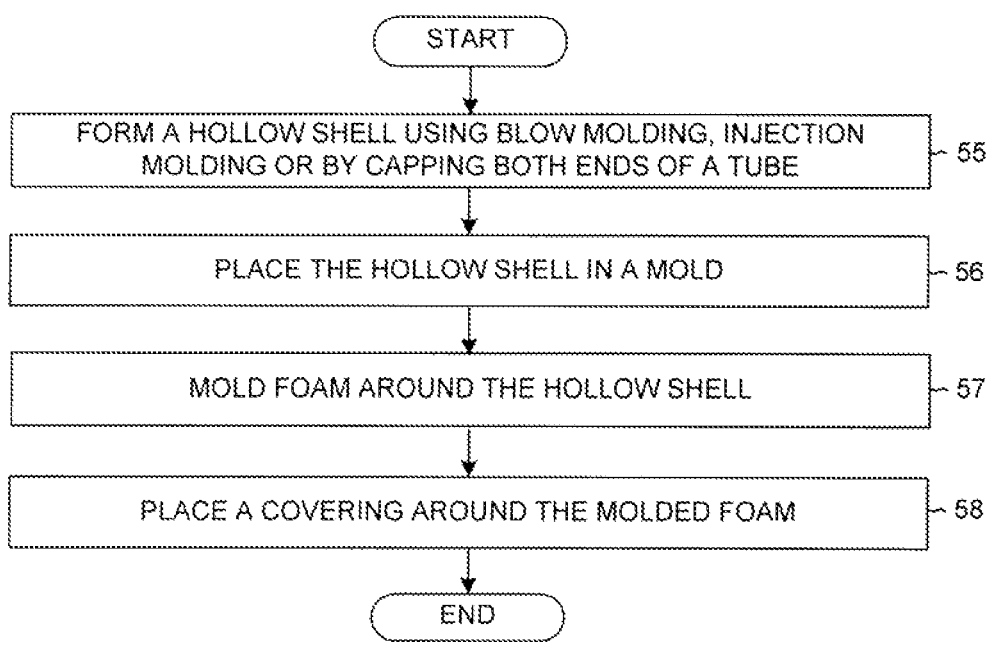
FIG. 20 is a flowchart of steps of a method of manufacturing the foam seating articles of the previous figures.

FIG. 20 is a flowchart illustrating steps 55-58 of a method of manufacturing the foam seating articles described above. Molding foam around a hard plastic shell is a simpler and less costly manufacturing process than shaping metal and wood to make a frame and then adding springs, padding and upholstery. And it is easier to make curved shapes by molding the inner shell and outer foam than it is to make a curved inner frame from wood or metal. In addition, the foam and plastic construction does not include nails that can come loose with extended use.

In a first step 55, hollow shell 13 is formed using blow molding, injection molding or by attaching disks to both ends of a tube. When blow molding is used to make hollow shell 13, a tube of plasticized resin is placed inside a first mold and then sealed at both ends. The first mold is closed, and air is blown into the tube of resin such that the resin sheet expands outwards towards the walls of the mold and takes the shape of the interior of the mold. To enhance the adhesion of foam to the outside surface of shell 13, the shell is given an uneven outer surface with dimples or grooves by providing microbumps or ribs on the inside surface of the first mold. The resin tube is then cured. The first mold is opened, and the cured resin shell 13 is removed from the mold.

In step 56, the hollow shell 13 is placed in second mold 15. Shell 13 must be supported inside second mold 15 so that the shell does not sit at the bottom of the mold and so that there is spacing between shell 13 and all of the inside walls of second mold 15.

In step 57, foam is molded around the outer surface of hollow shell 13. Liquid foam precursors are injected into the space between shell 13 and the inner walls of second mold 15. Different kinds of foams can be successively poured into second mold 15. For example, the precursors of an extra hard foam with an ILD of about twenty are first added to fill the bottom several inches of space 18 in second mold 15. Then the precursors of HD polyurethane foam with an ILD of about fifteen are added until about the bottom half of space 18 is filled. Finally, memory foam is poured into the remaining space 18 between shell 13 and the inner mold walls. The memory foam has an ILD of about twelve. The liquid foam precursors of the molded foam layer 19 are cured, and the foam with shell are removed from the second mold 15.

In step 58, covering 12 is then placed around molded foam layer 19 and hollow shell 13. Covering 12 is made of woven fabric, nonwoven fabric, leather or a conformal plastic or rubber layer. For example, foam seating article 54 of FIG. 19 can be given a conformal rubber covering by dipping the foam layer 40 and shell into a synthetic rubber bath.

Figure 21:
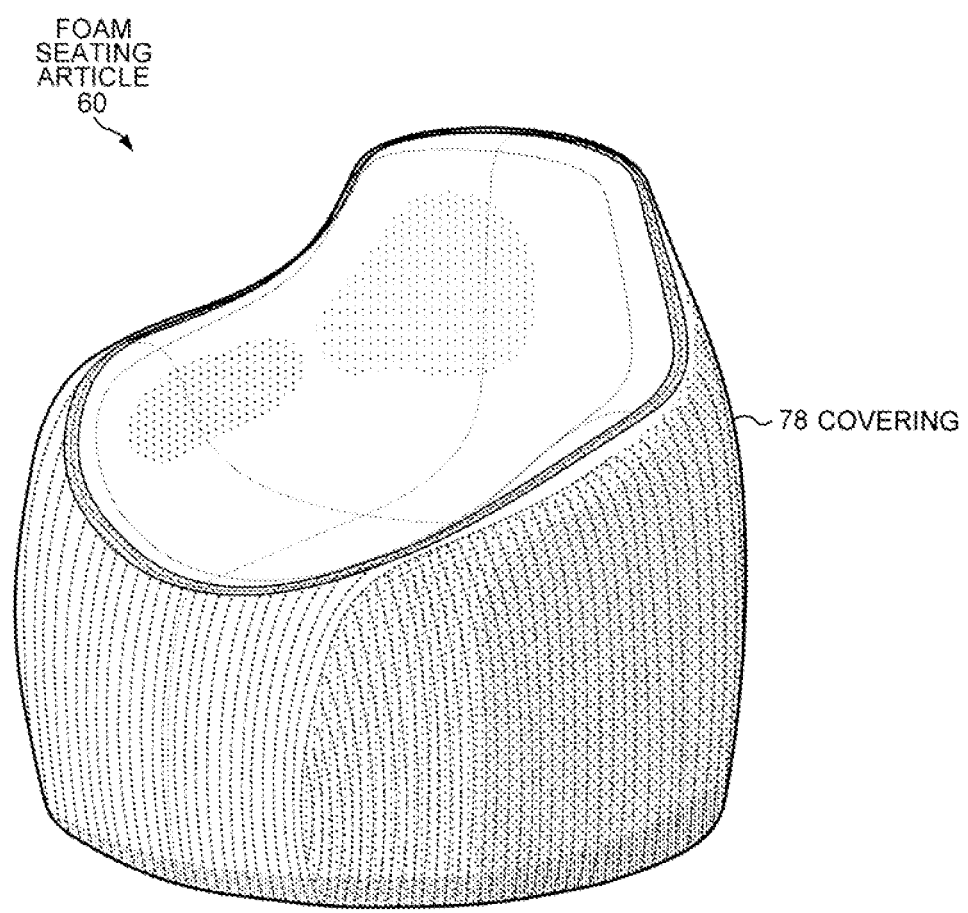
FIG. 21 is a perspective view of another embodiment of a foam seating article made by molding foam around a solid inner core of polyurethane or polystyrene foam.

FIG. 21 shows another embodiment of a foam seating article 60 in which foam is molded around a solid inner core. Although seating article 60 is shown in the form of a chair, the embodiment can also be configured as a sofa, chaise lounge, bench, Ottoman or other support for a sitting or reclining person. Chair 60 has an outer layer of softer foam molded around an inner core of harder foam. An advantage of foam seating article 10 with the hollow hard-plastic shell is the light weight construction in which the air in the shell does not contribute to the weight. Although the solid inner foam core of chair 60 weighs more than air plus the plastic shell of chair 10, the solid inner foam core can nevertheless be very light weight for the support it provides. Chair 60 still weighs less than an equivalently sized chair with an inner wood or metal frame.

Although the molded foam of the solid foam core has a hardness that is greater than that of the foam of the outer layer, the foam core is made of a lower density foam than that of the outer layer. A lower density foam is not necessarily softer. The advantage of a light weight inner core for seating article 60 can be achieved by choosing the lowest density nontoxic molded foam that is rigid enough to provide the structural support required for seating and back support. Applicants have determined that a sufficiently rigid inner core can be made of foam containing between 100 kg and 120 kg of methylene diphenyl diisocyanate (MDI) for every 100 kg of polyether-derived polyurethane polyol. Foam made in this manner can have a hardness of greater than twenty-five on the Shore A scale with a density of less than one pound per cubic foot. The hardness of rigid foams is typically measured on the Shore A scale, whereas the hardness of soft foams is typically measured on the Shore 00 scale or by the Indentation Force Deflection (IFD). The IFD (25%) measurement is the amount of force in pounds required to push a fifty-square-inch disk down 25% of the total thickness of the foam. A very rigid soft foam has an IFD (25%) of about forty. A rigid foam with a hardness of about 25 Shore A has a hardness of about 76 Shore 00 and a very large but less meaningful IFD.

Figure 22:
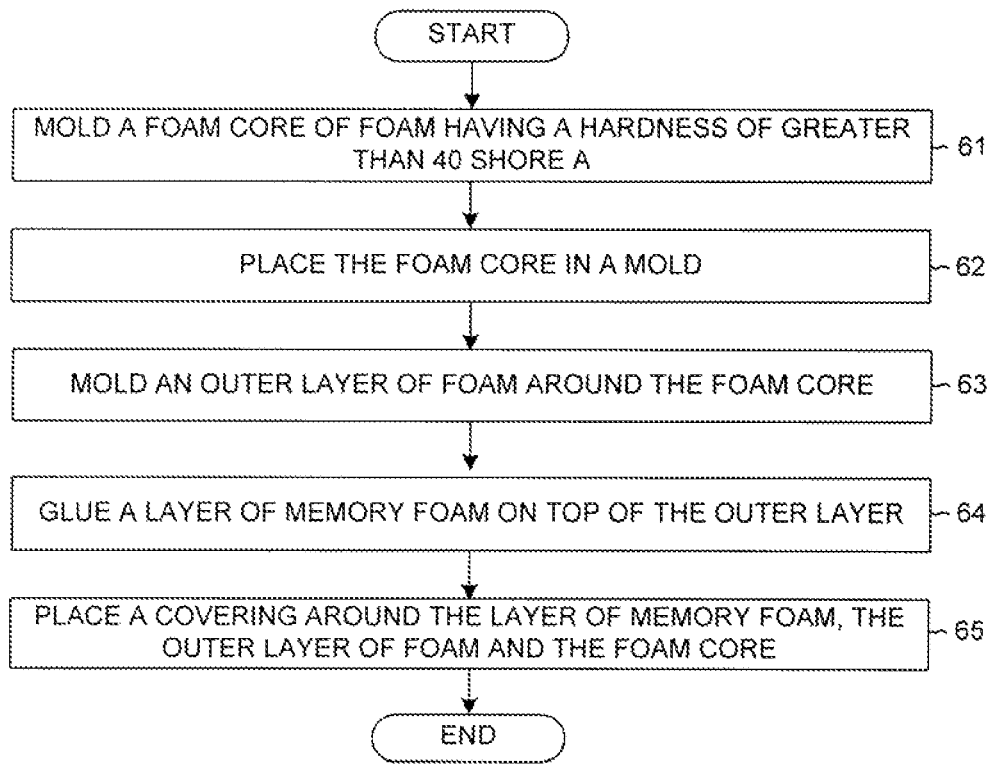
FIG. 22 is a flowchart of steps of a method of manufacturing the foam seating articles of FIG. 21.

FIG. 22 is a flowchart illustrating steps 61-65 of a method of manufacturing foam seating article 60. Molding an inner foam core as well as an outer foam around the inner core is simpler and less costly than shaping metal and wood to make a frame and then adding springs, padding and upholstery to make furniture. Moreover, curved shapes are easier to make by molding an inner foam core and an outer foam layer than by assembling pieces of wood or metal to make the curves.

Figure 23:
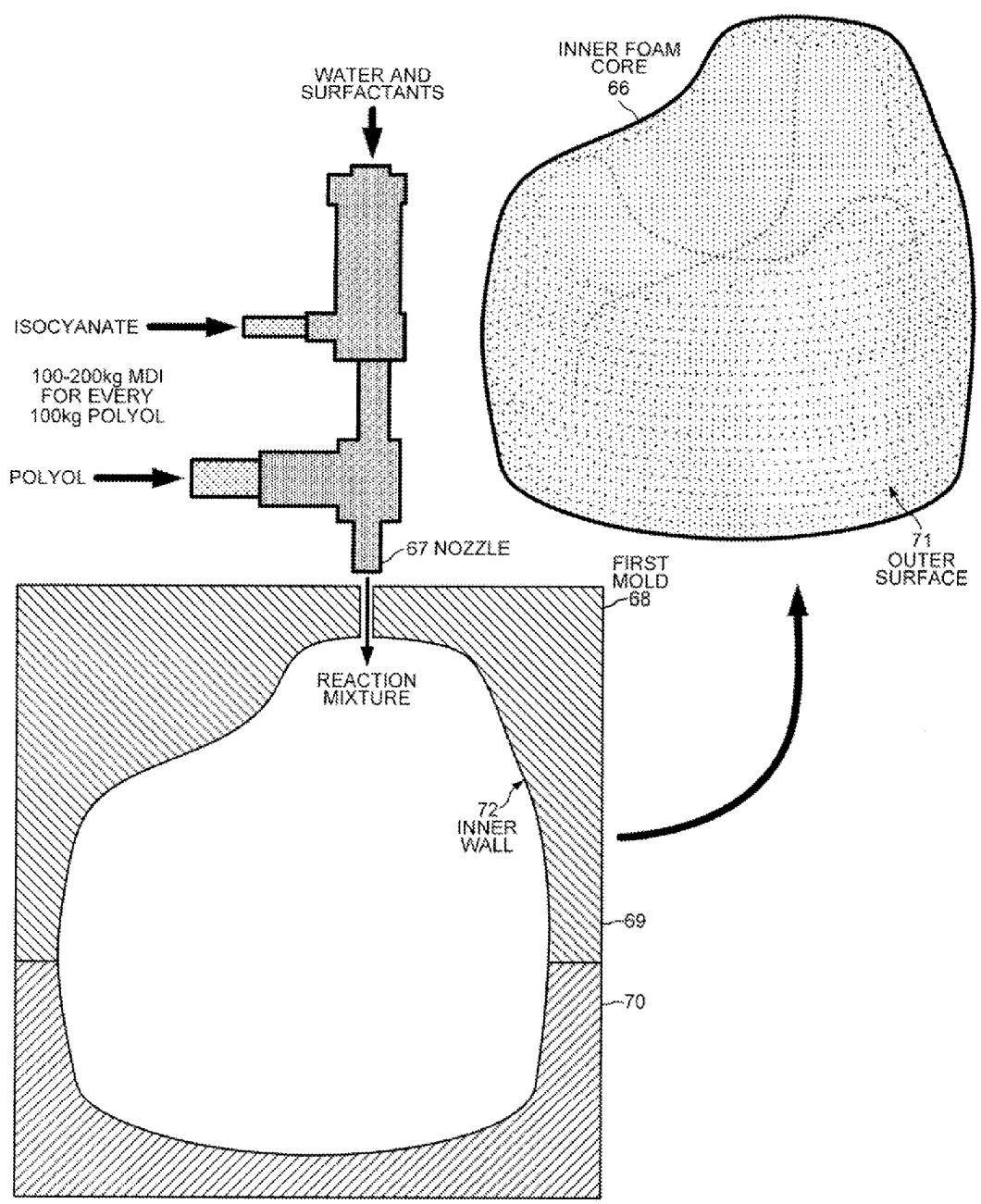
FIG. 23 illustrates the step of molding a solid inner core having a hardness of greater than twenty-five on the Shore A scale and a density of less than one pound per cubic foot.

FIG. 23 illustrates a first step 61 in which a foam core 66 is molded from rigid foam having a hardness of greater than twenty-five on the Shore A scale and a density of less than one pound per cubic foot. Foam core 66 is made by reacting a polyurethane polyol with a diisocyanate. Polyurethane polyols are typically derived from either polyesters or polyethers and have two or more —$CH_2OH$ functional groups. The diisocyanate used to make polyurethane foams are typically either a toluene diisocyanate (TDI) or a methylene diphenyl diisocyanate (MDI) (also called diphenylmethanediisocyanate). MDI is considered to be less toxic than TDI. Increasing the ratio of diisocyanate to polyol in the foam increases the stiffness and decreases the elasticity of the foam. In one embodiment, foam core 66 is made of a polyether-derived polyurethane polyol and 4,4'-methylene diphenyl diisocyanate (MDI). The polyether-derived polyurethane polyol has a molecular weight between 500 and 800, such as optimally 700. Between 100 kg and 120 kg of MDI is added for every 100 kg of the polyurethane polyol. For example, the ratio of MDI to polyurethane polyol is 110 kg to 100 kg. In another embodiment, foam core 66 is made of a polyether-derived polyurethane polyol, 4,4'-methylene diphenyl diisocyanate (MDI) and a mixture of a 2,4- and 2,6-isomers of toluene diisocyanate (TDI). For every 100 kg of the polyurethane polyol, about 100 kg of MDI and 10 kg of TDI are added.

In step 61, the polyurethane polyol and the diisocyanate are mixed, and then water and surfactants are added to the reaction mixture. The surfactants aid in mixing incompatible components of the reaction mixture and help to control the size of the gas bubbles and resulting foam cells. The bubbles are formed by $CO_2$ generated in the reaction. The $CO_2$ forms a network of cells, many of whose membranes rupture and leave open cells supported by polymer struts. Adding more water generates more $CO_2$, bigger bubbles, an expanded polymer network and a lower density foam. A low density yet stiff inner core 66 is desired. Enough water is added to create a rigid foam having a density between 15-18 kg/$m^3$ (0.94-1.1 lbs/$ft^3$). The reaction of the diisocyanate with water is exothermic, however, and adding too much water can cause the foam to scorch.

FIG. 23 illustrates the foam raw materials (polyol, isocyanate, water and surfactants) being pumped into a mixing head and being discharged through a nozzle 67 into a first mold 68. First mold 68 has multiple sections, such as a top portion 69 and a bottom portion 70. The raw materials are allowed to set up in the first mold 68 for about fourteen minutes at 35° C. The resulting molded foam is the inner foam core 66, which is removed from the first mold 68 and cured at room temperature for about twenty-four hours. During the curing process outside of the first mold 68, the exothermic reaction between the water and the diisocyanate is allowed to terminate naturally in order to prevent the physical degradation of the foam. The curved surfaces of foam core 66 can more easily be made by molding foam than by covering pieces of wood or metal with upholstery. The rigid foam of inner foam core 66 has a hardness of at least 25 Shore A and 76 Shore 00. At this extreme hardness, the IFD (also called the indentation load deflection) of the foam is difficult to measure using regular testing equipment. The rigid foam of inner foam core 66 has a density of less than one pound per cubic foot.

In order to improve the bonding between the inner foam core 66 and an outer layer of foam that will be molded around the foam core 66, the outer surface 71 of foam core 66 is made uneven. Dimples, grooves or crevices are formed on outer surface 71 of foam core 66 by providing micro-bumps or ribs on the inner wall 72 of the first mold 68. The foam of the outer layer is then molded into and sets up in the dimples, grooves and crevices and becomes more attached to foam core 66. FIG. 23 shows rows of dimples that have been formed in the outer surface 71 of inner foam core 66.

Figure 24:
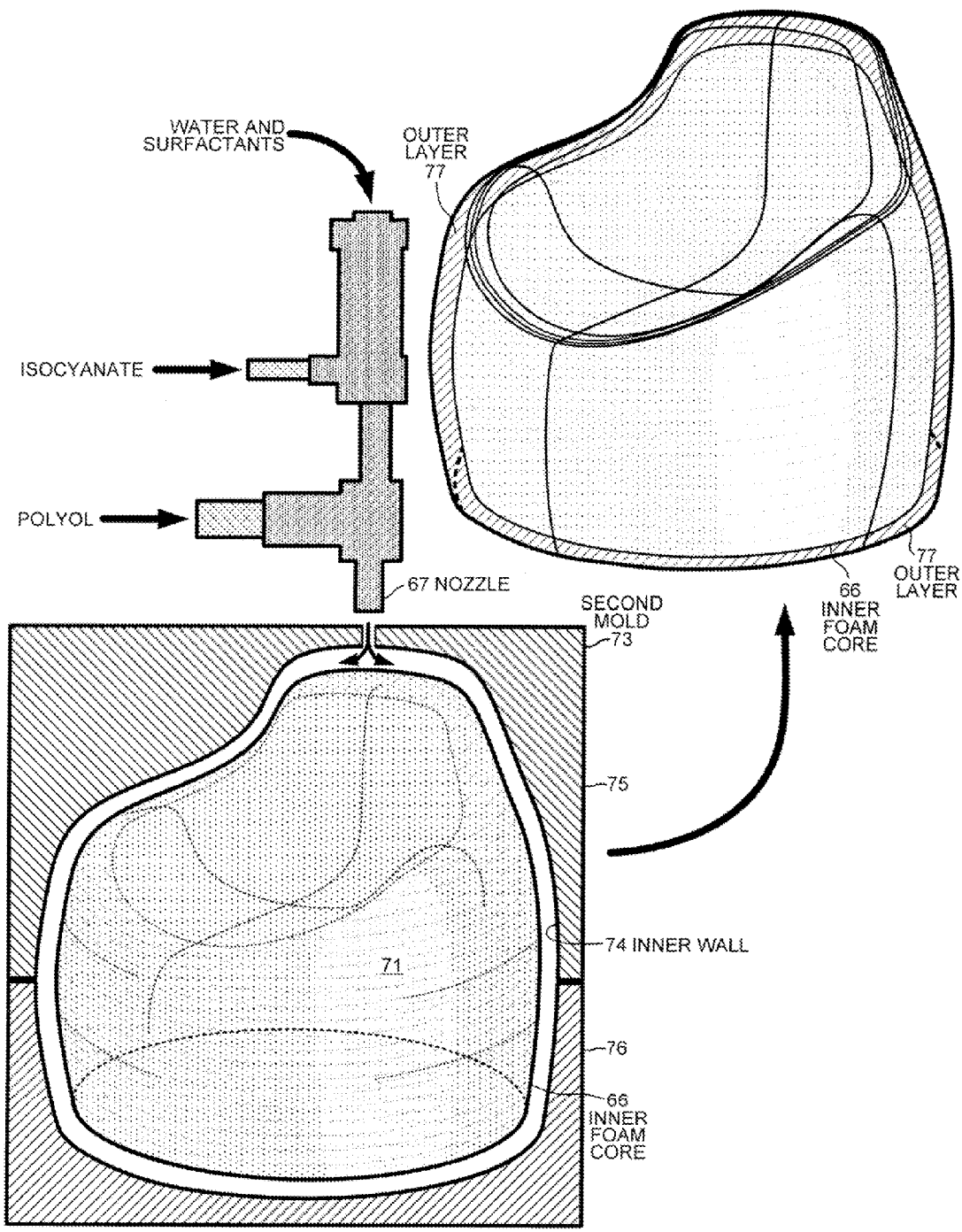
FIG. 24 illustrates the step of molding an outer layer of foam in the space between the inner wall of a second mold and the outer surface of the solid inner core.

In step 62, inner foam core 66 is placed in a second mold 73, as shown in FIG. 24. Foam core 66 is supported inside second mold 73 so that there is a space between the inner wall 74 of second mold 73 and the outer surface 71 of foam core 66. In some embodiments, foam core 66 is allowed to sit at the bottom of the inner chamber of second mold 73 so that the space between inner wall 74 and outer surface 71 of foam core 66 exists only around the sides and above the top of the foam core. In one embodiment, the space between inner wall 74 and outer surface 71 is evenly thick so that an outer layer of foam can be conformally molded around foam core 66. As with first mold 68, second mold 73 also has multiple sections, including a top portion 75 and a bottom portion 76.

In step 63, an outer layer 77 of foam is molded around foam core 66. Outer layer 77 is also made by reacting a polyurethane polyol with a diisocyanate. The foam of outer layer 77 is made by combining 55 kg of MDI for every 100 kg of polyether-derived polyurethane polyol. The polyurethane polyol has a molecular weight between 2000 and 4000, such as optimally 3000.

FIG. 24 illustrates the foam raw materials (polyol, isocyanate, water and surfactants) being pumped into a mixing head and being discharged through nozzle 67 into second mold 73 in the space between inner wall 74 and outer surface 71 of foam core 66. The raw materials are allowed to set up in second mold 73 for about twelve minutes at 50° C. The resulting outer foam layer 77 around inner foam core 66 is then removed from second mold 73 and allowed to cure at room temperature. The softer foam of outer foam layer 77 has a hardness of less than 20 Shore A or 70 Shore 00. In one embodiment, outer foam layer 77 is high-density polyurethane foam (HD foam) having a density between 1.5 to 2.5 pounds per cubic foot and an IFD (25%) of about fifteen. In other embodiments, outer foam layer 77 is memory foam or natural latex foam.

Figure 25:
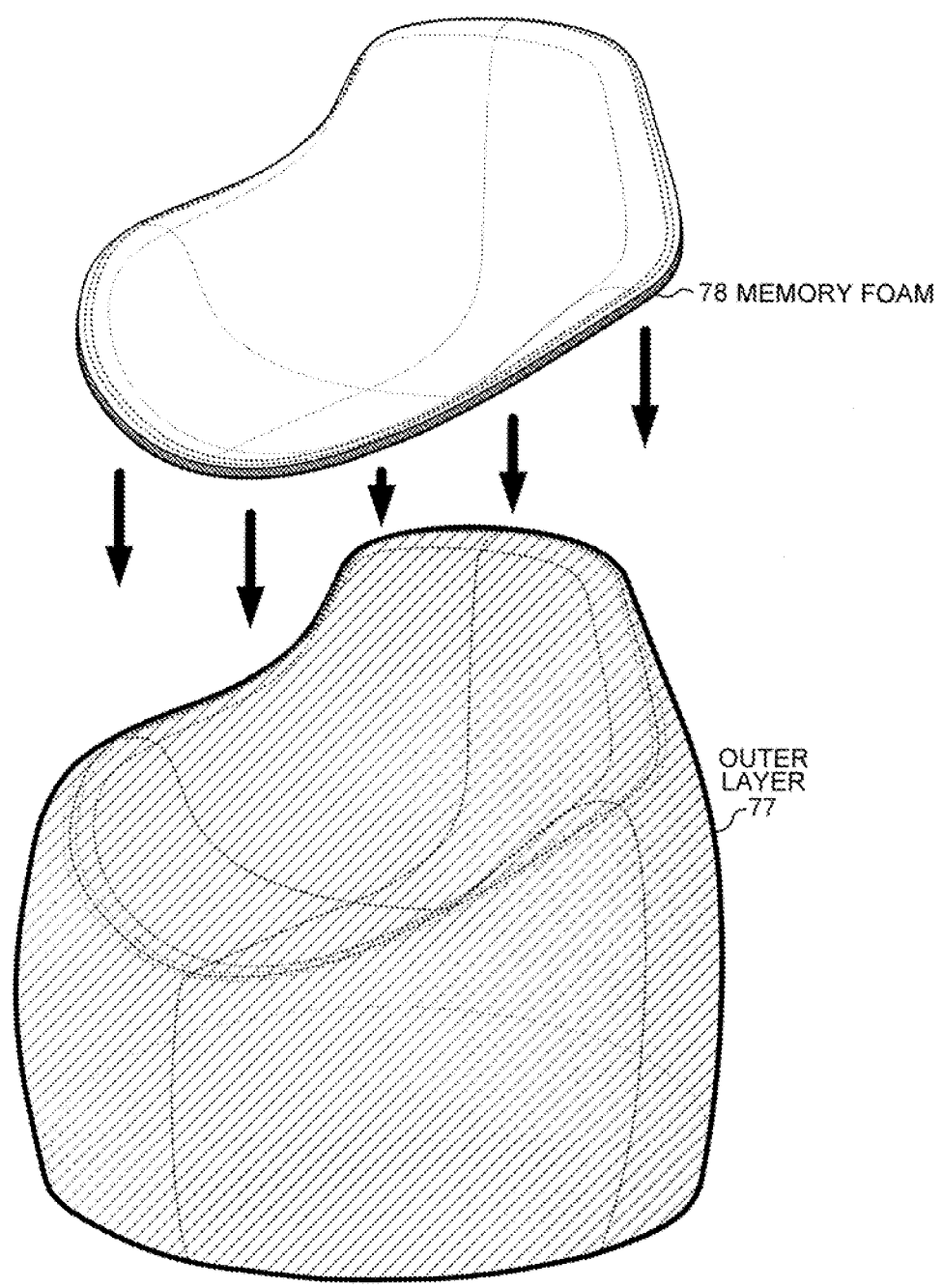
FIG. 25 illustrates the step of gluing a layer of memory foam to the top of the outer layer of molded foam.

FIG. 25 illustrates step 64, in which a layer of memory foam 78 is glued on top of outer foam layer 77. The memory foam 78 is softer than outer foam layer 77 and provides a more comfortable curved sitting surface. Memory foam 78 has an IFD of about twelve and a density between three and 5.5 pounds per cubic foot. In the embodiment in which outer foam layer 77 is memory foam, no addition layer of memory foam 78 is added to the top of outer foam layer 77.

In step 65, a covering 78 is placed around the layer of memory foam 78, the outer foam layer 77 and the inner foam core 66. The covering 78 can be a woven fabric, a nonwoven fabric, leather or even a conformal plastic layer. The covering 78 on foam seating article 60 shown in FIG. 21 is woven fabric.

In yet another embodiment, inner core 66 is made of expanded polystyrene (EPS) instead of polyurethane foam. The expanded polystyrene is a white rigid material made by expanding polystyrene beads with steam and bonding the beads together under pressure in a mold, such as first mold 68 that is capable of maintaining the internal pressure. Inner core 66 is not made from extruded polystyrene (Styrofoam®). The expanded polystyrene has a density of less than two pounds per cubic foot and a hardness of more than 25 Shore A. The expanded polystyrene has a compressive resistance at 1% strain of about 10 pounds per square inch (psi). The outer layer 77 of foam is then molded around the inner core 66 of expanded polystyrene in the same manner as foam is molded around the inner core of rigid foam in step 63. The inner core of expanded polystyrene (EPS) is somewhat heavier than an inner core of rigid polyurethane foam that provides the same strength and support for outer layer 77.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A seating article comprising:
   a foam core made of molded foam having a hardness of greater than 25 Shore A;
   an outer layer of foam molded completely around the foam core, wherein the outer layer of foam has hardness of less than 20 Shore A; and
   a covering enclosing the outer layer of foam and the foam core.

2. The seating article of claim 1, wherein the outer layer of foam is taken from the group consisting of: HD foam, memory foam and latex foam.

3. The seating article of claim 1, wherein the covering is taken from the group consisting of: a woven fabric, a non-woven fabric, leather, and a conformal plastic layer.

4. The seating article of claim 1, wherein the molded foam of the foam core has a density of less than 1.5 pounds per cubic foot.

5. The seating article of claim 1, wherein the foam core has an uneven outer surface, and wherein the outer layer of foam is molded into the uneven outer surface.

6. The seating article of claim 1, further comprising:
   a layer of memory foam glued on top of the outer layer of foam, wherein the covering encloses the layer of memory foam.

7. The seating article of claim 1, wherein the seating article includes no wood or metal.

8. The seating article of claim 1, wherein the foam core is made of a polyether-derived polyurethane polyol and methylene diphenyl diisocyanate.

9. The seating article of claim 8, wherein the foam core contains between 100 kg and 120 kg of methylene diphenyl diisocyanate for every 100 kg of polyurethane polyol.

10. A seating article comprising:
    a solid core made of a polymer material;
    an outer layer of foam molded completely around the solid core, wherein the polymer material of the solid core has a hardness that is greater than that of the foam of the outer layer, and wherein a portion of the solid core forms a seat back around which the outer layer is conformally molded; and
    a covering enclosing the outer layer of foam and the solid core.

11. The seating article of claim 10, wherein the seating article includes no wood or metal.

12. The seating article of claim 10, wherein the polymer material is expanded polystyrene.

13. The seating article of claim 12, wherein the expanded polystyrene has a density of less than two pounds per cubic foot.

14. The seating article of claim 10, wherein the polymer material is made of a polyether-derived polyurethane polyol and methylene diphenyl diisocyanate.

15. The seating article of claim 14, the polymer material contains between 100 kg and 120 kg of MDI for every 100 kg of polyurethane polyol.

16. The seating article of claim 14, wherein the polymer material has a hardness of greater than 25 Shore A and a density of less than 1.5 pounds per cubic foot.

* * * * *